United States Patent [19]

Davidson

[11] 4,201,090
[45] May 6, 1980

[54] BUOYANT INSTRUMENT CASE AND HOLDER

[76] Inventor: William M. Davidson, Box 74, Mountain Lakes, N.J. 07046

[21] Appl. No.: 940,331

[22] Filed: Sep. 7, 1978

[51] Int. Cl.$^2$ .................... G01D 11/24; G04B 37/08
[52] U.S. Cl. ........................................ 73/431; 9/9;
368/147; 368/291; 116/28 R; 116/306
[58] Field of Search ............... 73/431, 178 R; 116/26,
116/284, 305, 285, 281, 280; 58/90 R, 46 W

[56] References Cited

U.S. PATENT DOCUMENTS

| | | | |
|---|---|---|---|
| 2,924,495 | 2/1960 | Haines | 73/431 X |
| 3,621,649 | 11/1971 | Vulcan et al. | 58/90 B |
| 3,677,087 | 7/1972 | Alinari | 73/431 X |
| 3,712,138 | 1/1973 | Alinari | 73/431 X |
| 3,828,611 | 8/1974 | Shamlian et al. | 73/431 R |
| 3,948,038 | 4/1976 | Takagi | 58/90 R |
| 3,981,201 | 9/1976 | Jeannet | 73/431 |
| 4,088,018 | 5/1978 | Anderson et al. | 73/178 R |
| 4,136,515 | 1/1979 | Thompson et al. | 58/91 |

*Primary Examiner*—Daniel M. Yasich

[57] ABSTRACT

A device for mounting, displaying and protecting instruments, such as timers, comprised of a water-tight, buoyant case that can be optionally worn on the person or mounted pivotably in a bracket or holder for remote display. Provision is made for manual operation of enclosed instrument without penetration of seals.

7 Claims, 4 Drawing Figures

BUOYANT INSTRUMENT CASE AND HOLDER

This invention relates to a buoyant, water-proof instrument case and holder that is useful for the display and protection of small instruments, such as timers, in or around a marine environment. Provision is made for operation or control of the instrument manually without penetration of the water-proof seals.

Other instrument cases offer water-proof construction and protection for the instrument, such as in the case of water-proof timers. However, in most instances, such devices are designed for a single-purpose use, such as a diver's wrist watch, and do not lend themselves to fixed mounting for remote display. More importantly, such instrument cases are not made to float when accidentally dropped into water or submerged.

This invention provides a sealed, water-proof case of lightweight, buoyant construction, by means of which the instrument can be used in a variety of ways. At the option of the user, the device described herein can be used in a holder for remote visual display, can be carried on the person, or can be used underwater. Furthermore, the instrument can be operated manually while sealed in the case, either in the atmosphere or when submerged.

One object of this invention is to provide an instrument case, together with holder, that is simply constructed, compact, durable, reliable and safe to use, requiring no tools, while at the same time being low in cost to manufacture.

Another object of this invention is to provide an instrument case that can accomodate a wide variety of instruments, including different makes and sizes of spring-wound timers, as well as electronic digital timers and other similar instruments using crown or plunger type actuator controls.

Another object of this invention is to provide an instrument case that, at the option of the user, can be readily worn on the person or easily mounted in a holder for remote visual display.

Another object of this invention is to provide an instrument case that, together with holder, will permit simple, rapid, manual adjustment of instrument position in the holder for optimum remote visual display, including provision for one-hand manual operation of the instrument.

Another object of this invention is to provide means for the re-winding of instruments, such as spring-wound timers, without the necessity for removal of the instrument from the case, or the case from its holder.

Still another object of this invention is to provide a combination of instrument case and holder that can be mounted simply on marine or other related equipment, such as the deck of a sailboat, in a manner that will avoid snagging of lines.

Other objects, advantages and novel features of this invention will become apparent from the following descriptions of the invention when considered in conjunction with the accompanying drawings wherein:

BRIEF DESCRIPTION OF THE DRAWINGS

FIG. 1 (b) shows a typical application of this invention as a stopwatch case together with holder for on-deck display and use in timing racing starts for small sailboats.

FIG. 2 (b) shows a side view and partial cross-section at a—a to illustrate internal construction.

DETAILED DESCRIPTION OF THE INVENTION

Figure 1A:
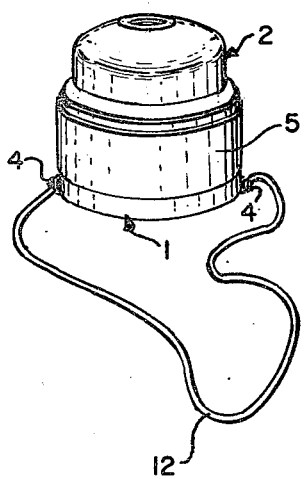
FIG. 1 (a) illustrates pictorially one version of the instrument case with cord attached to its trunnions.
Figure 1B:
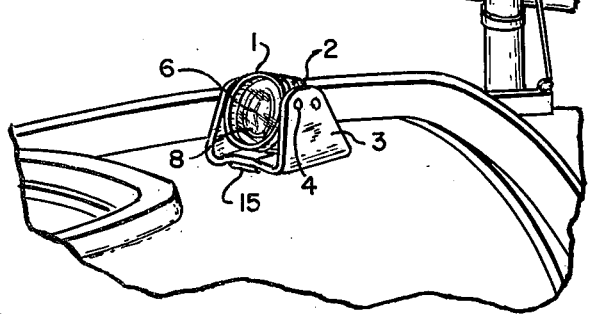

Referring in greater detail to the drawings, it can be seen in FIG. 1 (b), that illustrates a remote visual display application, how the position of the instrument can be adjusted by pivoting to suit the individual skipper, and further, that the display is always visible, with no hands needed to tell time during the race starting sequence, such as is the case with a wrist-band mounted stopwatch.

Figure 2A:
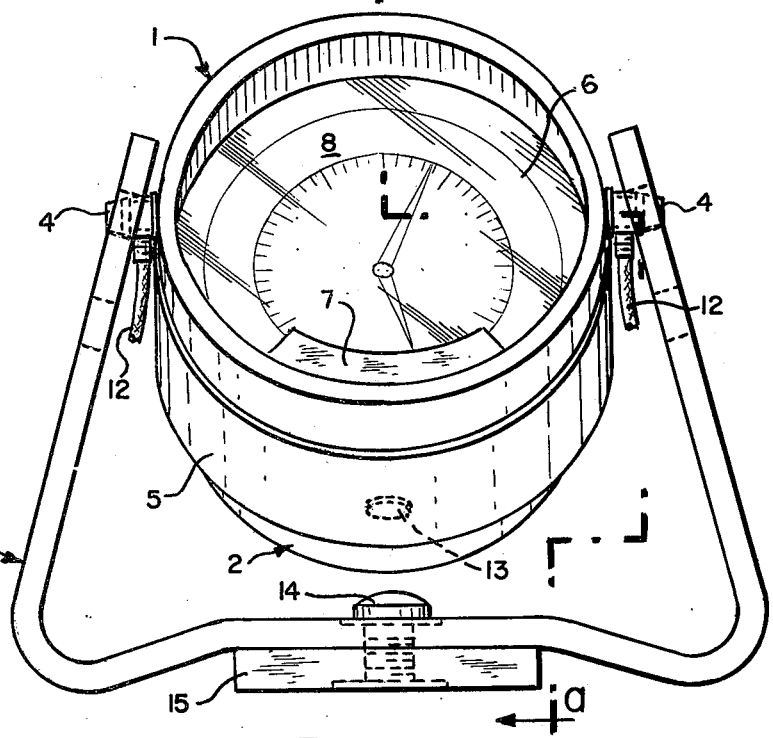
FIG. 2 (a) shows a front view of the construction of a typical instrument case completely assembled with its holder or bracket.
Figure 2B:
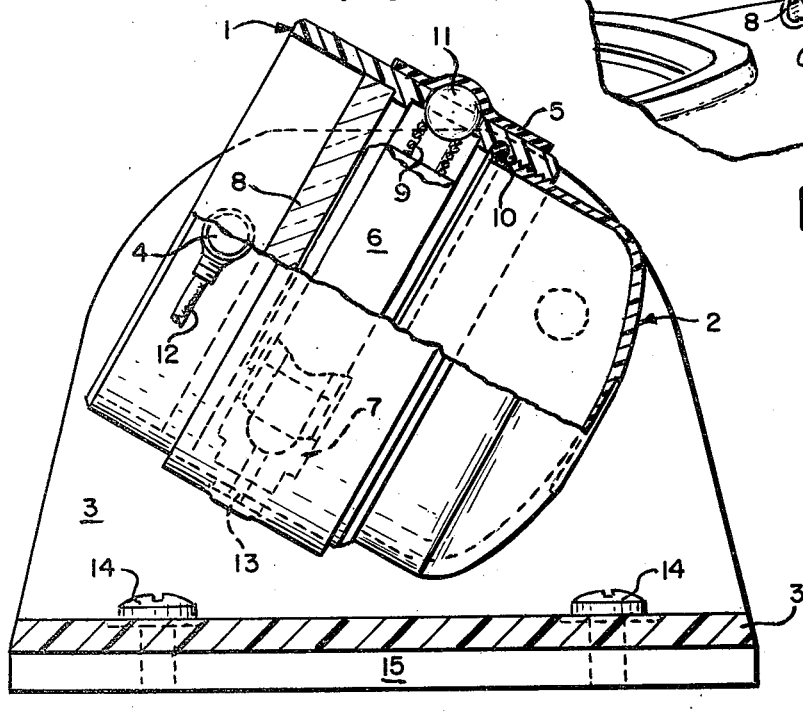

FIGS. 2 (a) and (b) illustrate the detail construction of a typical instrument case with holder. Cylindrical housing 1 encloses and supports instrument 6 which in the case illustrated is a spring-wound stopwatch. Control crown 11 of timer 6 is extended through a small round perforation in housing 1. The body of timer 6 is supported on support segment 7 which is secured to housing 1 by means of fastener 13. The vieiwng end of housing 1 is closed by lens 8 which is sealed to housing 1 by bonding means around its periphery. The opposite end of housing 1 is closed by cap 2 which is threadably attached to housing 1 and sealed by seal ring 10 which is compressed between housing 1 and cap 2. The radial openings in housing 1 for control crown 11 and fastener 13 are sealed by means of elastic band 5 which is stretched to fit snugly over the outside of housing 1. Band seal 5 can seal a multiple number of similar radial openings in housing 1.

Trunnions 4 are rigidly attached to housing 1 by mechanical means, such as rivets or screws, external to the sealed case. Cord 12 is releasably attached to trunnions 4 and may be used either as a neck band for carrying the instrument case on the person or for securing the case to bracket 3 for added security. The complete instrument case assembly, as shown in FIG. 1 (a), comprised of housing 1, cap 2, band 5, timer 6, support segment 7, lens 8, seal ring 10, fastener 13 and trunnions 4 can be pivotably supported in bracket 3 by means of said trunnions, as shown in FIG. 1 (b). Bracket 3 is releasably attached to mounting plate 15 by means of fasteners 14. Mounting plate 15 is fixedly attached to the deck or other surface by means of rivets or other fasteners (not shown). Spring 9, which is added as part of timer assembly 6, pushes against crown 11 to assist in overcoming the elastic force of band 5 together with any hydrostatic pressure, such as would exist when the device is submerged.

The proper choice of materials is an important element of this invention. Housing 1, cap 2 and lens 8 must be made of strong, lightweight, plastic materials with density close to that of water, e.g. acrylic or ABS materials. Truunions 4 are made of material that will produce sliding friction when engaged with bracket 3; to further increase this friction, the mounting holes in bracket 3 are constructed at an angle with trunnions 4; in addition, the spring force of bracket 3 applies pressure against trunnions 4 to resist turning of the instrument case.

In the use of the invention described herein, an instrument, such as a timer 6, may be installed inside of the case assembly, FIG. 1 (a), after removal of cap 2 from housing 1 (ref. FIG. 2 (b)). Support segment 7 and spring 9 can be readily selected or adjusted to accomodate the size, shape and operation of timer 6. Also, timer 6 may have more than one control 11 and thus require more than one penetration of housing 1. The weight of timer 6 must be within a prescribed maximum so that the total weight of case assembly and instrument 6 will not exceed the displacement weight of the case assembly. After timer 6 has been installed, cap 2 is threaded into housing 1 until firm contact has been established with seal ring 10. Band 5, which is made of elastic rubber or plastic material, is then stretched to fit over housing 1 to cover penetrations for control 11 and fastener 13. The case assembly (FIG. 1 (a)) with timer 6 installed is then ready for wear on the person, by means of cord 12, or for installation in bracket 3 by means of trunnions 4. To install the case assembly (FIG. 1 (a)) in bracket 3, the case is tilted to allow for insertion inside of bracket 3 from either open end, one of the trunnions 4 being lowered to fit inside of the radiused corner of bracket 3. The upper trunnion 4 is then inserted into one of the mounting holes provided in bracket 3. Now the case assembly can be raised into position by spreading the sides of bracket 3 against the spring force of said bracket, until the free trunnion 4 mates with the opposing hole in bracket 3. The case assembly (FIG. 1 (a)) can now be pivoted manually so that timer 6 can be displayed at any angle with respect to horizontal in the range of 60° to 90°. Timer 6 is held in the position selected by the sliding friction of trunnions 4 against bracket 3 holes, the friction force being enforced by the spring action of bracket 3 against trunnions 4. There is a wedging action between bracket 3 and trunnions 4 by virtue of the fact that the axis of trunnions 4 is, by design, not aligned with the axis of the mounting holes in bracket 3.

For operation of timer 6, manual pressure is applied to depress crown 11 which protrudes through the aperture in housing 1 under band 5. Timer 6 can thus be operated for "start", "stop" or "reset" modes by such external manual pressure against the protrusion of band 5 which, being elastic, allows crown 11 to be depressed. This is accomplished simply by clamping thumb and forefingers on opposite sides of band 5 and compressing crown 11. In this manner, operation of timer 6 is the same as in normal use of such timers. Should it become necessary to rewind timer 6, it is important to be able to perform this function without having to remove timer 6 from its protective case and holder. This can be accomplished by pivoting the case assembly (FIG. 1 (a)) in bracket 3 into an inverted position. When band 5 is pulled back to uncover crown 11, thereby removing restraint on timer 6, said timer will be guided by support 7, allowing crown 11 to penetrate sufficiently beyond housing 1 to permit re-winding, as in normal manual operation of such timers. Then, said case assembly is again inverted back to its normal display position and band 5 is restored to its proper position to seal the opening for crown 11.

As shown in FIGS. 1 (b)& 2, bracket 3 is contoured to provide for total enclosure of case assembly (FIG. 1 (a)) in a manner to prevent snagging of lines that may pass across the deck in the vicinity of the assembled case and holder (FIG. 1 (b)).

To remove case assembly (FIG. 1 (a)) from bracket 3, manual pressure is applied to bracket 3 in order to overcome its spring force and free trunnions 4. By releasing one of said trunnions first, the case assembly (FIG. 1 (a) may be lowered toward the base of bracket 3, allowing the opposing trunnion 4 to be disengaged from bracket 3. The case assembly (FIG. 1 (a)) can then be removed from bracket 3.

When case assembly (FIG. 1 (a)) is immersed in water, it will float on the surface with cap 2 extending above the surface. Bright color finishes or markings on cap 2 may be used to aid in the visual location and recovery of case assembly (FIG. 1 (a)). Since said case assembly is a water-tight enclosure, timer 6 is protected from moisture. Case assembly (FIG. 1 (a)) is also constructed as a pressure vessel so that it can protect timer 6 from the environment even when submerged to considerable depth and, therefore, is useful for many diving operations where visual display of instruments would be needed.

Case assembly (FIG. 1 (a)) can also serve to provide added protection for timer 6 from mechanical shock or vibration damage, simply by the use of resilient shock-mount materials around control 11 and for the construction of support 7.

To open case assembly (FIG. 1 (a)) for servicing of timer 6, cap 2 is unthreaded manually from housing 1. Timer 6 can then be removed by removing pressure from band 5 against crown 11. In some case, it may be necessary to remove fastener 13 and slide support 7 to one side in order to remove timer 6.

While the device described herein makes reference to use of a timer for instrument 6, many different types of instruments can be accomodated in case assemblies with construction similar to that of case assembly (FIG. 1 (a)). For example, an electronic stopwatch could be substituted for timer 6 by mounting its digital display facing lens 8; printed circuit boards and batteries are normally assembled on the back side of the digital display. Control of such electronic timers can be accomplished either by the use of spring-actuated switches, similar to control 11, or by means of magnetic reed switches that do not require penetrations in housing 1. In the latter case, band 5 would not be required.

As will be apparent to those skilled in the art in the light of the foregoing disclosure, many modifications, alterations and substitutions are possible in the practice of this invention without departing from the spirit or scope thereof.

I claim:

1. A water-tight, buoyant instrument case to enclose one of a variety of selected instruments employing crown or plunger-type controls, such as timers, comprising:

a water-tight housing consisting of two sections, a first section being a chamber closed at one end by a lens sealed thereto, and a second section being a closure, such as a cap, wherein said second section is releasably engaged to and sealed with said first section, such as by threadable means, for purposes of instrument installation and removal; said first section having a chamber to receive a selected one of the instruments with plunger-type controls; and wherein, the combined displacement volume of said first and second sections is sufficient to offset the weight of case and instrument and provide positive buoyancy therefor, in order to insure flotation thereof, when said case with instrument enclosed is immersed in water;

flexible sealing means compressed between said first and second sections to form a water-tight enclosure when said two sections are engaged;

a plunger-type control in said instrument, said instrument supported by a removable support segment, mounted near the middle portion of said first section, said instrument being viewed through said lens which is made a part of said first section;

at least one aperture near the middle portion of said first section for access to instrument controls through said one of the apertures, thereby providing means for instrument actuation by manual depression of said plunger-type control;

elastic band sealing means, consisting of a flat, flexible band elastically stretched to fit peripherally over the outer surface of said first section, thereby providing resilient sealing means for said one of the apertures and permitting actuation of said instrument control through said aperture by manual depression of said control with said flexible seal;

mounting means, such as trunnions, affixed to said case for use in coupling to a mounting bracket or cord carrying means.

2. In a water-tight, buoyant instrument case, the combination in accordance with claim 1, wherein manual re-winding of instruments, such as spring-wound stopwatches, can be accomplished without removal of instrument from said case by uncovering said aperture under said band seal and inverting said instrument case, allowing said instrument to move, guided by said support segment, until said plunger-type control protrudes through said aperture in said first section sufficiently to permit re-winding as in the normal use of such instruments.

3. In a water-tight, buoyant instrument case, the combination in accordance with claim 1, wherein said plunger-type control is equipped with a booster spring biasing means to overcome forces of compression on said band sealing means, thereby returning said plunger control to a normal position of rest following manual depression thereof.

4. In a water-tight, buoyant instrument case, the combination in accordance with claim 1, wherein said support segment is constructed of resilient, shock-absorbing materials to provide a resilient mounting means for protection of said instrument against shock or vibration.

5. In a water-tight, buoyant instrument case, the combination in accordance with claim 1, wherein said mounting means is comprised of a set of trunnions, affixed opposingly on the exterior of said first section, adjacent to but not communicating with said water-tight chamber.

6. In a water-tight, buoyant instrument case, the combination in accordance with claim 5, wherein said instrument case is mounted by means of said trunnions in a one-piece bracket formed from spring-like material, such as acrylic sheet, wherein the display position of said instrument case is controlled by friction between said trunnions and the mating holes in said bracket, said friction being obtained by wedging action caused by misalignment between axis of said trunnions and axis of holes in said bracket.

7. In a water-tight, buoyant instrument case, the combination in accordance with claim 5, wherein said instrument case is carried or secured by means of a cord attached to said trunnions.

* * * * *